Oct. 17, 1933.  R. B. MUNRO  1,930,859
MEANS FOR REMOVING SPINDLES AND CUPS FROM BICYCLE BEARINGS AND THE LIKE
Filed Aug. 25, 1931
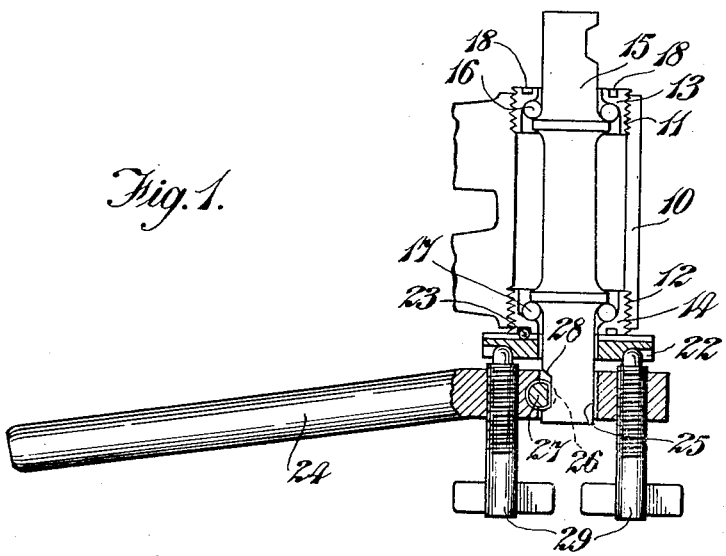
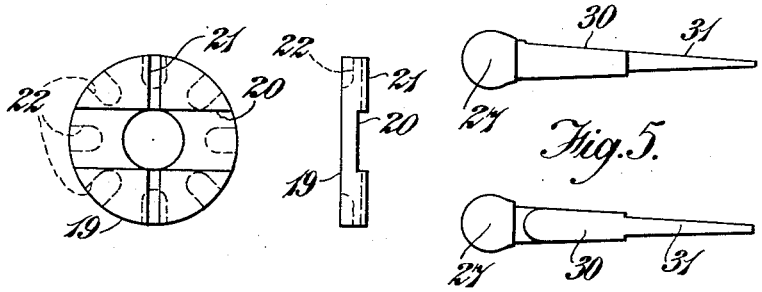
INVENTOR
R. B. Munro.
By Lacey & Lacey,
Attys Patented Oct. 17, 1933

1,930,859

UNITED STATES PATENT OFFICE 1,930,859

MEANS FOR REMOVING SPINDLES AND CUPS FROM BICYCLE BEARINGS AND THE LIKE

Roderick Bain Munro, Kingussie, Scotland

Application August 25, 1931, Serial No. 559,264, and in Great Britain August 28, 1930

6 Claims. (Cl. 81—90)

This invention relates to means for removing spindles and cups from bicycle bearings and the like, and has for its object to provide an improved form of device for facilitating this operation.

The improved device is particularly applicable to that form of bearing common to the bottom brackets of bicycles, and comprising a tubular member secured to the frame, the ends of said member being threaded internally and being provided with screwed-in cups each for the accommodation of a row of balls, a spindle passing completely through said tubular member in a direction longitudinally thereof and being pivotally supported by said balls, which latter are adapted to bear against a pair of suitably shaped flanges formed on the spindle. The means usually provided for unscrewing the end cups comprise one or more holes drilled in the side of the cup, which holes are adapted to receive a small projection formed upon a spanner or key and it is well-known that in the removal of cups, especially when the latter are rusted or are a tight fit in the threads, great difficulty is experienced as the projections tend to ride out of the holes when a turning movement is applied to the spanner or key.

According to the invention there is provided a device for removing spindles and cups from bicycle bearings comprising a bar adapted to be secured temporarily to the spindle and provided with adjustable means for engaging directly or indirectly with one of the end cups of the bearing so as to clamp the spindle and cup together for rotation as one with the bar.

The device may comprise a bar adapted to be secured temporarily to the spindle, a member for engaging one of the end cups of the bearing, and means whereby the bar and the member may be brought into engagement to clamp the spindle and cup together for rotation by means of the bar.

Preferably, the cup-engaging member comprises an annular plate which engages directly or indirectly with the outer portion of the end cup, said member being formed with recesses or projections for engagement with clamping means incorporated with the turning bar.

If desired, the bar may be secured temporarily to the spindle by means of a tapered pin or wedge adapted to engage the spindle at the flat portion usually provided thereon.

The bar may be provided with a plurality of thumb-screws or equivalent, disposed substantially parallel with the axis of the spindle when the bar is in place thereon and adapted to bear at their ends against the annular plate so as to force the latter against the end cup, and at the same time to lock the bar in position upon the spindle through the medium of the tapered pin.

A preferred form of the invention is illustrated in the accompanying drawing in which:—

Figure 1 shows in sectional plan the device in position for removing an end cup;

Figures 2 and 3 show in side and end elevation respectively one form of annular plate; and Figures 4 and 5 show in side elevation and plan respectively one form of tapered pin.

As shown in Figure 1, the bearing, which is typical of those normally used for the bottom brackets of bicycles and other forms of light machinery, comprises a tubular outer casing 10 formed at its end with screw threads 11 and 12 for the accommodation of ball bearing cups 13 and 14 respectively. The spindle indicated at 15 is supported within said cups 13 and 14 by means of two series of steel balls 16 and 17. The outer surfaces of the cups 13 and 14 are normally formed with recesses 18 by which said cups 13 and 14 are screwed into place in the tubular casing 10 usually with considerable difficulty.

The device, according to the present invention, for facilitating this operation comprises an annular plate 19 shown in detail in Figures 2 and 3, and formed on one of its side faces with a wide diametral groove 20 and a comparatively narrow groove 21, substantially semi-circular in cross-section, and extending substantially at right-angles to the groove 20. The opposite face of the plate 19 is formed with a number of recesses 22 spaced circumferentially therearound.

In use the plate 19 is passed over the spindle 15 at that end thereof adjacent to the cup 14 to be removed, and a small steel ball or equivalent, indicated at 23, is inserted into one of the holes 18 so that it projects therefrom for engagement with the groove 21 of the disc 19.

The device comprises in addition a bar 24 formed at one end with a hole 25 adapted to pass over the end of the spindle 15, and with a transverse hole 26 extending into the hole 25. Thus, when the bar 24 is positioned upon the spindle 15 a tapered pin 27 may be inserted into the hole 26 so as to engage the spindle 15 by a flat portion 28 normally formed thereon for the attachment of the usual cranks of the bicycle.

For bringing the bar 24 into operative engagement with the plate 19, two thumb-screws 29 are threaded into the bar 24 and are provided with rounded ends for engagement with the recesses 22. Thus, when the screws 29 are tightened, the plate 19 is clamped into firm engagement with the cup 14 and at the same time the tapered pin 27 is firmly held against the flat portion 28 so that on rotating the bar 24 the cup 14 is unscrewed from the tubular casing 10 and withdrawn as one with the spindle 15 and the series of balls 17.

The pin 27 is shown in detail in Figures 4 and 5, from which it will be noted that two portions 30 and 31 of different diameters are provided. The portion 30 is normally used when the end of the spindle 15 is sufficient to allow the proper accommodation of the plate 19 and the bar 24, while the narrow portion 31 is often found useful when spindles 15 of shorter length than normal are being used, for, provided it is possible to insert the extreme end of the pin between the edge of the transverse hole 26 and the end of the flat portion 28 a firm grip is obtained upon the spindle when pressure is applied through the screws 29.

In cases where the end surfaces of the cups 13 and 14 are formed with comparatively wide transverse projections, these may be engaged directly by the walls of the groove 20 without the use of a ball 23 or other keying member.

It will be observed that the device is of considerable service in replacing the various parts of a bearing as the balls 17 may be assembled between the spindle 15 and the cup 14, the device being then secured in position so that the whole assembly may be inserted into the tubular casing 10. The device may then be left in position while the balls 16 are arranged in position and the cup 13 screwed in place.

In order that the device may be suitable for use with bearings having various distances from the outer surface of the cup 14 to the flattened portion 28 of the spindle 15, ample length of thread should be provided on the thumb-screws 29, or alternatively the variation may be met by having plates 19 of various thicknesses or providing packing washers or equivalent (not shown) for use therewith.

Although one form of the invention only has been described it will be readily understood that various modifications may be made in the constructional details without departing from the invention.

Further, the invention may readily be utilized for the removal of bearing cups of all kinds, whether standard or not, and by its use, a great saving of time is effected, as well as the elimination of flying splinters of metal which are liable to be produced when a hammer and punch are used in removing bearing cups.

What I claim is:—

1. A device for removing a spindle and a cup from a bearing, said device comprising a bar engageable with the spindle to swing about the axis thereof, means for locking the bar against displacement endwise of the spindle, and means to lock the bar and cup to turn in unison.

2. A device for removing a spindle and a cup from a bearing, said device comprising a bar formed with a bore to accommodate the spindle and a second bore having its axis in a plane at an angle to the first bore, the bar being swingingly movable about the axis of the spindle, a tapered pin adapted to be disposed in the second bore to engage the spindle for locking the bar against displacement endwise of the spindle, and means for locking the bar and cup to turn in unison including a tightening device for exerting pressure on the bar and cup in a direction axially of the spindle.

3. A device for removing a spindle and a cup from a bearing, said device comprising a bar engageable with the spindle to swing about the axis thereof, means to lock the bar against displacement endwise of the spindle, a plate freely disposed on the spindle, means to lock the plate and cup to turn in unison, and means to lock the plate to turn in unison with the bar.

4. A device for removing a spindle and a cup from a bearing, said device comprising a bar engageable with the spindle to swing about the axis thereof, means to lock the bar against displacement endwise of the spindle, a plate freely disposed on the spindle, means to lock the plate and cup to turn in unison, and a screw carried by the bar and engaging the plate to lock the bar and plate to turn in unison.

5. A device for removing a spindle and a cup from a bearing, said device comprising a bar engageable with the spindle to swing about the axis thereof, means for locking the bar against displacement endwise of the spindle, a plate freely disposed on the spindle between the bar and cup and provided in its side presented to the cup with a groove, means disposed in said groove and engaging the cup to lock the plate and cup to turn in unison, and means carried by the bar and engaging the plate to lock the plate and bar to turn in unison.

6. A device for removing a spindle and a cup from a bearing, said device comprising a bar engageable with the spindle to swing about the axis thereof, means locking the bar against displacement endwise of the spindle, a plate freely disposed on the spindle between the bar and cup, means coacting with the plate and cup for locking the plate and cup to turn in unison, the plate being provided in its side presented to the bar with a recess, and a binding screw mounted upon the bar and engaging in said recess to lock the bar and plate to turn in unison.

RODERICK BAIN MUNRO.